April 25, 1944. C. F. WINANS 2,347,228
METHOD OF PRODUCING ANTHRACENE
Filed May 28, 1941
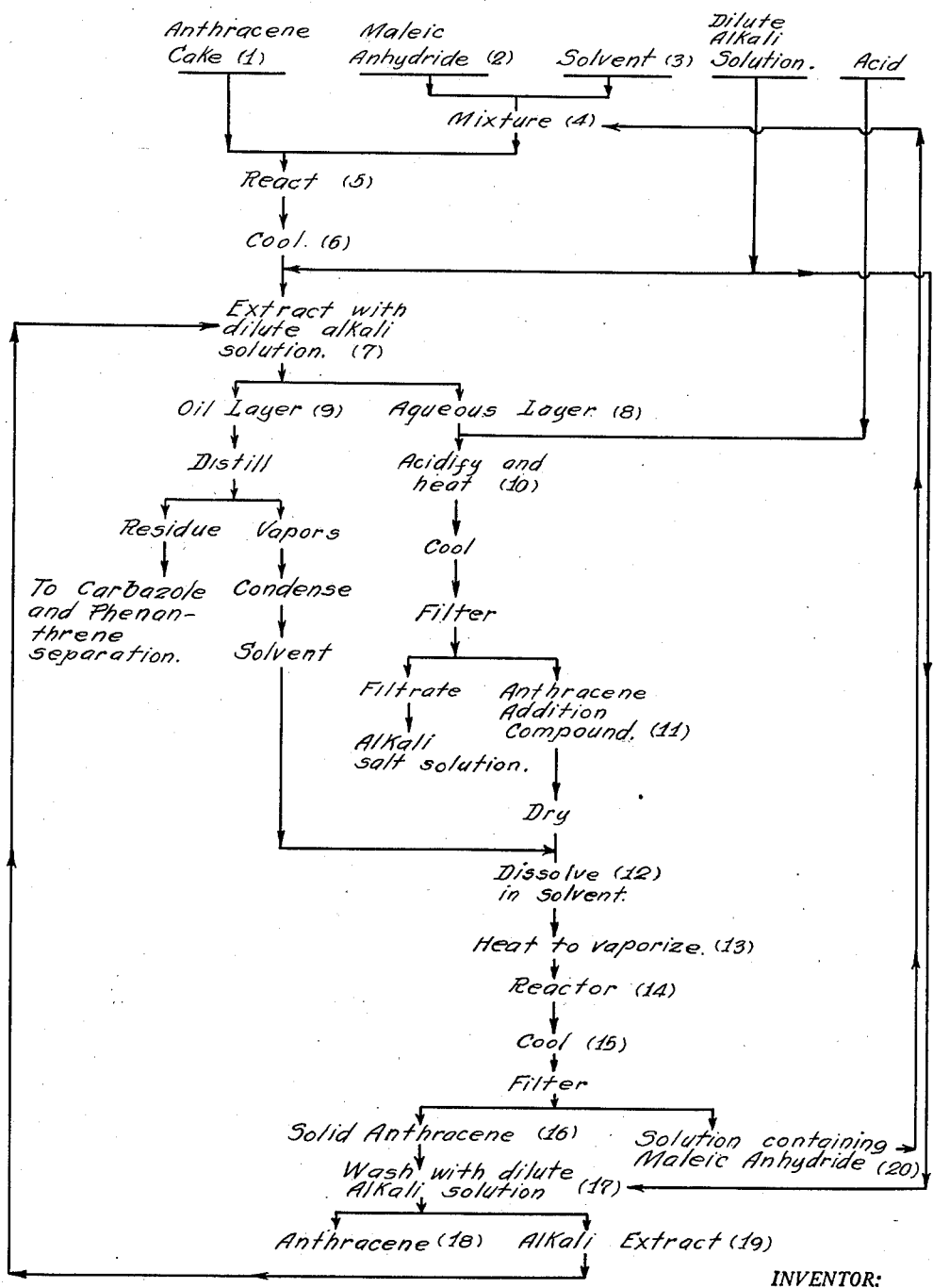

UNITED STATES PATENT OFFICE 2,347,228

METHOD OF PRODUCING ANTHRACENE

Charles Francis Winans, Swissvale, Pa., assignor to Koppers Company, a corporation of Delaware Application May 28, 1941, Serial No. 395,694

12 Claims. (Cl. 260—675)

This invention relates to improvements in the production of anthracene, and more particularly to the separation of anthracene from phenanthrene and carbazole, or from any of the compounds usually found in what is known in the coal tar industry as anthracene cake.

An object of the present invention is to provide improvements in methods of purifying anthracene. A further object is to provide methods of separating anthracene from mixtures containing the same by means of maleic anhydride.

Another object is to provide a method in which maleic anhydride is employed to effect recovery of anthracene as a saleable product and in which maleic anhydride may be repeatedly used in a cyclic process.

The process described and claimed herein includes reacting maleic anhydride with anthracene contained in a mixture, separating the resulting anthracene-maleic anhydride addition compound from the mixture, and decomposing the addition compound to obtain separately maleic anhydride and purified anthracene. The process is carried on preferably under conditions described in detail below.

Referring to the accompanying drawing, the flow chart presented therein illustrates generally various steps in one form of the process of the invention, which steps in themselves are highly effective in the recovery of anthracene from anthracene cake and which steps in combination make possible an economical use of maleic anhydride as an active agent in such recovery. Anthracene cake (1) or crude anthracene and a mixture (4) of maleic anhydride (2), and a solvent (3) are conducted into a heated chamber wherein the anthracene and maleic anhydride react (5) to form anthracene-maleic anhydride addition compound (9,10 - dihydroanthracene-9,10-endosuccinic anhydride) in accordance with the following equation:

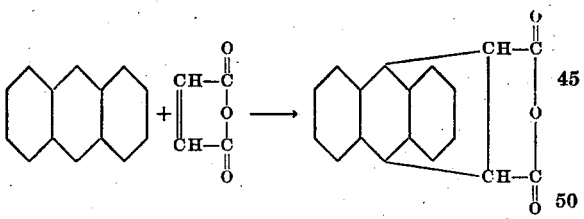

For brevity, the compound formed above is hereinafter referred to as anthracene-maleic anhydride. The reaction mass is permitted to cool (6) or is positively cooled to reduce the temperature thereof sufficiently to prevent too rapid evolution of steam upon the addition of aqueous alkaline solution serving as extractant for the anthracene-maleic anhydride addition compound. In contacting or thoroughly mixing the reaction mixture and the extractant (7), the following reaction occurs when sodium hydroxide solution is used as the extractant:

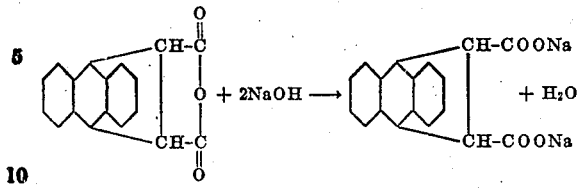

The water-soluble sodium salt of 9,10-dihydroanthracene-9,10-endo succinic acid (the free acid is hereinafter referred to as anthracene-maleic acid) formed in the last reaction separates out in an aqueous layer (8), and the constituents of the anthracene cake, such as carbazole and phenanthrene, other than anthracene, separate out in an oily layer (9). This oily layer is separated from the aqueous layer and heated to distill off solvent for further use in the process. The residue obtained in this distillation may contain amongst other materials phenanthrene and carbazole which may be separated from each other or refined, for example, by crystallization means.

The aqueous layer (8) is neutralized or acidified with acid (10), such as sulphuric acid, preferably while hot or boiling in order to precipitate anthracene-maleic anhydride in accordance with the following equation:

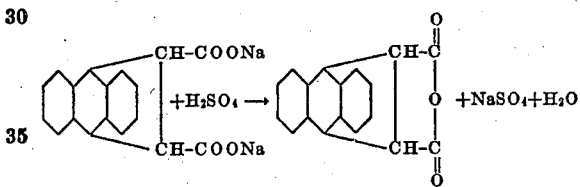

The above neutralization or acidificaiton is best carried out at higher temperatures so that the precipitate which forms is crystalline and easily filtered. At lower temperatures than 60° centigrade the precipitate is apt to be amorphous or not definitely crystalline and to contain anthracene-maleic acid. A satisfactory range of temperature for precipitation is approximately 80° to 100° centrigrade under which conditions anthracene-maleic anhydride is formed.

The precipitated anthracene-maleic anhydride (11) is separated by filtration and dried to remove adhering water, whereupon it is ready to be converted into anthracene and maleic anhydride. For this purpose the separated anthracene-maleic anhydride is dissolved (12) in a solvent. This solvent may be derived from distillation of the oily layer (9). The resulting solution of previously precipitated anthracene-maleic anhydride is introduced into a heating zone (13) wherein it is vaporized preferably substantially instantaneously. The vaporized material comprising vapors of anthracene-maleic anhydride addition compound, and solvent, is heated to proper temperatures in a reactor (14) for sufficient period to obtain practically complete dissociation of the addition compound. The dissociated material is then chilled at a relatively rapid rate to a temperature below that at which recombination of anthracene and maleic anhydride occurs and at which the solubility of anthracene in the simultaneously condensed solvent is quite low. The temperature reached in this chilling (15) may be, for example, about 15° centigrade.

The so-cooled materials at this point include fine crystals of antracene (16) which may be separated by filtration and may be washed with dilute alkali (17) to remove traces of the unconverted addition compound. The washed anthracene (18) is of high purity (98–99%) and is pale yellow in color. It has a melting point of approximately 217° centigrade. The aqueous alkali extract (19), obtained by washing the anthracene with alkalized solution (17), containing addition compound is employed for the extraction above described in step (7).

The mother liquor (20), from which solid anthracene has been removed, contains the regenerated maleic anhydride. It also contains a small proportion of dissolved anthracene and dissolved unconverted addition compound. This mother liquor, that is, the mixture of solvent and maleic anhydride, is flowed into storage, for example at (4), for treating further quantities of crude anthracene. Thus the maleic anhydride may be recycled or repeatedly used in the foregoing process. Additions of fresh maleic anhydride may be required from time to time to make up for losses sustained during dissociation of the addition compound. By proper manipulation these losses may be considerably minimized.

Crude anthracene in the form of anthracene cake usually contains about 40% anthracene, about 30% carbazole and about 30% phenanthrene. These proportions may vary, and any other mixture may be treated by the process of this invention. Maleic anhydride is readily obtained as a commercial product and is a substantially pure chemical. To obtain the addition compound the maleic anhydride is preferably used in stoichiometric ratio to the anthracene in the crude material treated and preferably not substantially in excess of that stoichiometrically required to react completely with the anthracene, thus reducing losses.

The solvent employed in the formation of the anthracene-maleic anhydride, is preferably xylene or solvent naphtha. These particular solvents are of special advantage because of their utility later in the process for separation of carbazole and phenanthrene. They can also be employed in the dissociation of the anthracene-maleic anhydride addition product.

Kerosene and benzene or other solvents of this type may also be used. Kerosene, however, is not particularly desirable since it does not hold carbazole in solution during the extraction step with dilute alkali solution such as a 4% sodium hydroxide solution. In the presence of benzene the addition compound is formed only after protracted boiling for four to five hours.

However, in the presence of xylene and solvent naphtha or in the absence of solvent the reaction under the preferred conditions occurs much faster, particularly at temperatures of about 130° and above. For instance, the reaction between anthracene and maleic anhydride in the presence of xylene at 150° centigrade takes place in about fifteen minutes, and the yields are practically quantitative.

The cooling of the addition compound after its formation, may be conducted by means of cooling media until the temperature is reduced to as low as about 100° centigrade. At this point a solution of sodium hydroxide, soda ash, potash or caustic potash, or the bicarbonates of sodium or potassium is employed to extract the addition compound from the reaction mixture in which it is formed. Ammonia solution is not particularly effective for this purpose. A 4% sodium hydroxide solution is particularly effective and it is preferred to carry on the extraction with this solution while maintaining the reaction mixture hot or at about 100° centigrade. An excess of about 2.5% of the sodium hydroxide solution is used.

In the acidification or neutralization of the solution of the alkali salt of 9,10-dihydro-anthracene-9,10-endo succinic acid, the mineral acid employed may be nitric acid, hydrochloric acid, or phosphoric acid, or mixtures of mineral acids, as well as sulphuric acid before mentioned, the latter being preferred. A 25% solution of sulphuric acid may generally be employed in an excess of about 2.5%. The acid strength is not of great importance, whereas the temperature of acidification is considered essential for obtaining proper yields of a product in suitable physical condition.

The precipitated product, formed by acidification, if in the form of dihydro-anthracene-9,10-endo succinic acid, may be converted to the corresponding anhydride by heating its aqueous suspension to 80° C. or higher, preferably at the boiling point.

Alternatively, the precipitated solid itself may be converted also if heated, say to 130° C. or higher, with removal of the water formed. This heating of the precipitated solid acid itself may be carried out in the absence of any added material as just stated, or, preferably, to facilitate the removal of the formed water, in the presence of an added substance such as xylene, solvent naphtha, kerosene, chlorobenzene, etc. For example 19.6 parts by weight of the 9,10-dihydro-anthracene-9,10-endo succinic acid in about 86 parts by weight of xylene may be heated at the boiling point of xylene, the vapors being condensed and returned to the system through a trap to remove water. When no more water is collected the xylene solution is allowed to cool, thus depositing about 16 parts by weight of dihydro-anthracene-9,10-endo succinic anhydride (M. P. 258 to 260° centigrade). The above-mentioned added substances, or inert liquid media, should have a boiling point preferably greater than 130° centigrade.

The formation of anthracene-maleic anhydride from anthracene-maleic acid is represented by the following equation:

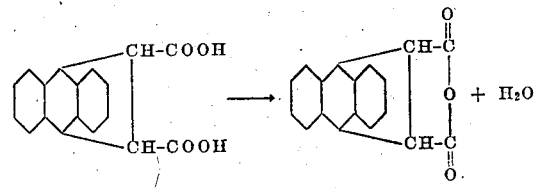

In the dissociation of the anthracene-maleic anhydride, to resolve it into the desired anthracene and regenerated maleic anhydride, carriers inert with respect to the addition compound and products of dissociation may be employed. In addition to other functions, carriers have the function in the present process of sweeping the products of dissociation into, through, and out of the heated zone of dissociation. Various carrier media may be used, as for instance, vapors of the above-mentioned solvents and of gasoline, kerosene or fractions thereof, or various gases including nitrogen, carbon dioxide, methane, natural gas, coke oven gas, hydrogen, etc. Steam or mixtures of the various substances mentioned may also be employed as carriers or as diluents. The ratio of condensible carrier media to addition compound is preferably not generally greater than 10:1 by weight although higher ratios may be used. In the procedures set forth herein, carriers or diluents may be omitted but their inclusion is preferred.

Mere distillation of the addition compound brings about a certain proportion of decomposition but is apt to result in a recombination of the constituents in the cooler parts of the distillation apparatus. The decomposition may be effected in vacuo which to some extent eliminates the reformation of excess proportions of the addition compound. However, the high volatility of the maleic anhydride causes losses of this material. Such losses are prevented by the use of the above carrier media.

The temperature at which dissociation of the addition compound is carried on is preferably above 260° centigrade. The vapors, for instance, may be conducted through a tube inside a furnace heated in the range of about 400° to 500° centigrade. One form of apparatus that may be employed comprises a heated reservoir for the solution of the addition compound in, for instance, xylene, provided with a capillary orifice which permits the solution at atmospheric or superatmospheric pressures to be dropped into a flash chamber that can be an iron pipe of relatively small diameter heated in a metal bath to about 350° centigrade. This pipe is connected to a reaction tube of relatively small diameter packed with steel turnings and heated to controlled temperatures. The latter tube is connected to a receiver provided with cooling means. The capillary orifice in the reservoir outlet delivers the solution at such a rate as to cause immediate formation of the vapors.

Apparatus constructed of iron or glass is preferred. Copper is objectionable because of certain undesirable reactions that occur in the dissociation treatment. For the purpose of illustrating the present invention the following examples are presented:

*Example 1.*—100 parts by weight of anthracene cake containing about 40 parts by weight of anthracene are mixed with 100 parts by weight of xylene and about 22.3 parts by weight of maleic anhydride. The resulting mixture is heated at about 150° centigrade for about 15 minutes. The reaction mass is cooled to about 100° centigrade and then mixed with a solution containing about 18.5 parts by weight of sodium hydroxide and 460 parts by weight of water. The aqueous layer that separates out in the form of a solution of the sodium salt of dihydro-anthracene-9,10-endo succinic acid is then mixed with about 23.3 parts by weight of sulphuric acid in 100 parts by weight of water at about 100° C. The liberated addition compound is filtered out and dried to remove substantially all adhering water. The dried addition compound (about 61.3 parts by weight) is dissolved in about 500 parts by weight of xylene. The resulting solution is passed through a reactor kept at a temperature about 400° to 450° centigrade. The vapors from the reactor are chilled whereupon solid anthracene separates out. The solid anthracene may be separated from the solution of maleic anhydride by filtration or centrifugalization. The anthracene is washed with a 4% solution of sodium hydroxide and the wash liquor is mixed with the sodium hydroxide solution employed in the original extraction step of the addition compound. The maleic anhydride in the separated xylene solution is mixed with fresh anthracene cake for further production of the addition compound.

*Example 2.*—About 100 parts by weight anthracene cake and 20 parts by weight of maleic anhydride along with 200 parts by weight of xylene are boiled in a reactor for about fifteen minutes. About 20 parts by weight of sodium hydroxide in 500 parts by weight of water are mixed with the xylene solution and boiled. After removal of the aqueous extract thereby obtained an additional 1 part by weight of sodium hydroxide in 250 parts by weight of water is added as a second extraction step to insure complete removal of the addition compound. The aqueous extract obtained is mixed with about 27.7 parts by weight of sulphuric acid (25%). A part of the solvent separated from the aqueous extract is distilled off and the residual solution is chilled to separate out the carbazole. The remainder of the solvent is distilled to obtain a residue of phenanthrene. The anthracene-maleic anhydride obtained from the aqueous extract is vaporized in a stream of steam and the mixture is passed through a heated reaction zone. The heated vapors are then condensed by rapid cooling to form solid anthracene and an aqueous solution of maleic acid. The maleic acid solution is evaporated and the maleic acid converted to the anhydride for further use in production of the addition compound.

*Example 3.*—A particularly desirable procedure comprises vaporizing the addition compound in a stream of hydrocarbon vapor such as xylene, passing the mixed vapors through a dissociation reactor in the range of approximately 275° to 500° centigrade, chilling the product, filtering out the solid formed upon chilling, washing the solid with a caustic solution to remove unconverted addition compound and to leave a residue of anthracene of relatively high purity. The xylene and the maleic anhydride condense out in the chilling step in the form of a solution which is used for the removal of additional anthracene from crude anthracene.

The following examples illustrate various procedures in dissociation of the anthracene-maleic anhydride addition compound and procedures in recovering anthracene in the form of addition compounds:

*Example A.*—Crude anthracene cake is fused and about 100 parts by weight of the fused cake are heated with about 20 parts by weight of maleic anhydride at about 150° to 170° centigrade for fifteen minutes in which time the reaction is complete. The product obtained by this procedure is generally in a state in which it must be mechanically ground before extraction of the anthracene with alkali solution.

*Example B.*—About 100 parts by weight of crude anthracene cake, about 20 parts by weight of maleic anhydride and about 172 parts by weight of xylene are heated at the boiling point of xylene for about fifteen minutes. On cooling the solution, crystals of carbazole and anthracene maleic anhydride are deposited, while phenanthrene remains in solution. The crystals deposited from the xylene may be treated with dilute alkali solution as in Example A to remove the addition compound in the form of an alkali salt.

*Example C.*—About 20 parts by weight of 9,10-dihydroanthracene-9,10-endo succinic acid are vaporized in an iron chamber at about 275° centigrade in a stream of superheated steam. The mixed vapors are then passed through an iron tube in a furnace the temperature of which is about 500° centigrade. The rate of passage of the gas through the tube is such that the contact time is about 0.22 second. The effluent is rapidly chilled to give a pale yellow solid and an aqueous solution. Evaporation of the water layer leaves a residue of maleic acid, which is converted to maleic anhydride and is used again in the process. The solid anthracene is washed with dilute sodium hydroxide solution to recover anthracene (melting point 213° to 215° centigrade) which is about 98.2% pure. Acidification of the sodium hydroxide solution in the above washing step yields a certain amount of addition compound from which additional anthracene may be recovered.

*Example D.*—About 20 parts by weight of 9,10-dihydroanthracene-9,10-endo succinic acid are vaporized in a stream of gas comprising about 20% natural gas and about 80% superheated steam, and passed through a heated dissociation chamber at such a rate that the contact time is about 0.22 second. The products resulting from this procedure comprise 4.5 parts by weight of maleic acid, 8.8 parts by weight of anthracene of high purity, and 3 parts by weight of recovered addition compound.

*Example E.*—About 19½ parts by weight of anthracene addition compound are vaporized and passed through a reactor in a stream of natural gas at a furnace temperature of about 360° centigrade at such a rate that the contact time is about 0.18 second. The recovery of anthracene may be carried on as indicated above.

*Example F.*—About 20 parts by weight of anthracene addition compound are vaporized at about 275° centigrade in a stream of vapors comprising about 77 parts by weight of benzene. The resulting mixture is passed into a dissociation tube at such a rate that the contact time is about 0.36 second. The products comprise about 11.1 parts by weight of anthracene of high purity, 0.96 part by weight of recovered addition compound, and 6.1 parts by weight of maleic acid after treatment with water.

*Example G.*—About 20 parts by weight of addition compound are vaporized and passed through a reactor in a stream of xylene vapor at such a rate that the contact time is about 0.4 second. The products obtained comprise 11.4 parts by weight of anthracene of high purity, 0.9 part by weight of recovered addition compound, and 6 parts by weight of maleic anhydride.

*Example H.*—20 parts by weight of addition compound are vaporized in a stream of vapors of about 86 parts by weight of xylene, and passed through a reactor at such a rate that the contact time is about 0.4 second. The effluent is chilled to give a solution of maleic anhydride and xylene, and a yellow crystalline solid which is filtered out. The solid (about 12.2 parts by weight) is washed with dilute sodium hydroxide solution which extracts traces of unconverted addition compound. About 11.4 parts by weight of anthracene of high purity are thereby obtained. The xylene solution contains recovered maleic anhydride which is used directly in the initial reaction with crude anthracene for the recovery of additional anthracene.

*Example I.*—A solution of about 13.5 parts by weight of 9,10-dihydro-anthracene-9,10-endo succinic anhydride in about 361 parts by weight of xylene at about 92° centigrade is flashed through a reactor at such a rate that the contact time is about 0.4 second. The products obtained are about 7.95 parts by weight of anthracene of high purity, 1.15 parts by weight of recovered addition compound, and about 3.96 parts by weight of maleic anhydride. Larger proportions of addition compound may be provided in the solution to be flashed by dissolving the addition compound under superatmospheric pressure, thereby avoiding the use of excessive amounts of solvent.

*Example J.*—An effective means of decomposing anthracene addition compound consists in heating it under pressure in the presence of water to temperatures of about 250° to 350° centigrade. About 15 parts by weight of 9,10-dihydroanthracene-9,10-endo succinic acid and about 60 parts by weight of water are heated in a closed vessel at superatmospheric pressure at the above temperatures to effect substantially complete dissociation. The time of heating varies depending upon the temperature. At 350° centigrade the time may be about 1 hour. At 257° the time may be about 2½ hours. The reaction mixture is thereafter cooled and the anthracene separated therefrom. Any decomposition products such as fumaric acid, maleic acid, etc., that may form, will not react with the anthracene on cooling.

What is claimed is:

1. A process of recovering anthracene from material containing it, which process comprises heating crude anthracene and maleic anhydride, in amount at most about that stoichiometrically required to react completely with the anthracene but not substantially in excess of that stoichiometrically required to react completely with the anthracene in the crude anthracene, in the presence of a volatile solvent to form anthracene-maleic anhydride, extracting anthracene-maleic anhydride from the resulting mixture with dilute alkali solution, adding acid to the alkali extract to acidify the latter and to precipitate an anthracene addition product, heating the addition product to dissociate the said product, separating anthracene therefrom, and reacting additional anthracene in crude anthracene with maleic anhydride obtained from the dissociated product.

2. A process of recovering anthracene from material containing it, which process comprises heating crude anthracene and maleic anhydride, in amount at most about that stoichiometrically required to react completely with the anthracene but not substantially in excess of that stoichiometrically required to react completely with the anthracene in the crude anthracene, in the presence of xylene to form anthracene-maleic anhydride, extracting anthracene-maleic anhydride from the resulting xylene solution with dilute alkali solution, adding acid to the alkali extract to acidify the latter and to precipitate an anthracene addition product, heating the addition product to dissociate the said product, separating anthracene from the resulting dissociated material, and reacting additional anthracene in crude anthracene with maleic anhydride obtained from the dissociated material.

3. A process of recovering anthracene from material containing it, which process comprises heating a mixture containing crude anthracene and maleic anhydride, in amount at most about that theoretically required to react completely with the anthracene but not substanially in excess of that theoretically required to react completely with the anthracene in the crude anthracene, to form anthracene-maleic anhydride addition compound, extracting the addition compound from the resulting mixture with a basic solution of an alkali compound, adding acid to the alkali extract to acidify the latter and to precipitate an anthracene addition product, heating the addition product to dissociate the said product, separating anthracene therefrom, and reacting additional anthracene in crude anthracene with maleic anhydride obtained from the dissociated product.

4. A process of recovering anthracene from material containing it, which process comprises heating a mixture containing crude anthracene, maleic anhydride and a hydrocarbon solvent to form anthracene-maleic anhydride addition compound, the said maleic anhydride being used in amount at most about that theoretically required to react completely with the anthracene but not substantially in excess of that theoretically required to react completely with the anthracene, extracting the addition compound from the resulting mixture with dilute alkali solution, adding acid to the alkali extract to acidify the extract and to precipitate an anthracene addition product, heating the addition product in the presence of an inert carrier to dissociate the said product, separating anthracene therefrom, and reacting additional anthracene in crude anthracene with maleic anhydride obtained from the dissociated product.

5. A process of recovering anthracene from material containing it, which process comprises heating a mixture containing crude anthracene, maleic anhydride and a hydrocarbon solvent to form anthracene-maleic anhydride addition compound, the said maleic anhydride being used in amount at most about that theoretically required to react completely with the anthracene but not substantially in excess of that theoretically required to react completely with the anthracene, extracting the addition compound from the resulting mixture with dilute alkali solution, adding acid to the alkali extract to acidify the extract and to precipitate an anthracene addition product, heating the addition product in the presence of hydrocarbon solvent to dissociate the said product and thereby obtain free anthracene and maleic anhydride, cooling the heated dissociated material to obtain anthracene in solid form and maleic anhydride in solution in the hydrocarbon solvent, and reacting additional anthracene in crude anthracene with the maleic anhydride in the said solution.

6. In a process of recovering anthracene, steps comprising heating crude anthracene and maleic anhydride, in an amount at most about that theoretically required to react completely with the anthracene but not substantially in excess of that theoretically required to react completely with the anthracene, in a hydrocarbon solvent to form anthracene-maleic anhydride, agitating and heating the resulting solution together with dilute alkali solution to extract anthracene-maleic anhydride from the solution, acidifying the extract to precipitate anthracene addition compound, and heating the latter compound to obtain free anthracene.

7. A process of recovering anthracene from a crude mixture thereof, said process comprising, heating said crude anthracene with maleic anhydride and thereby producing an anthracene-maleic complex from which anthracene is dissociable by means including heat, separating so-formed anthracene-maleic complex from the resultant mixture by an extraction agent adapted to separate said complex from impurity of said crude anthracene, heating in the presence of a carrier fluid admixed therewith so-separated anthracene-maleic complex and thereby dissociating the same into anthracene and a substance having the re-formed maleic radical, cooling the products of said dissociation in the presence of each other and thereafter separating refined anthracene from their mixture, and employing the re-formed maleic radical of said substance in the form of maleic anhydride to form additional anthracene-maleic complex with anthracene in a said crude mixture thereof.

8. A process of recovering anthracene from a crude mixture thereof, said process comprising, heating said crude anthracene in the presence of a liquid solvent with maleic anhydride and thereby producing an anthracene-maleic complex from which anthracene is dissociable by means including heat, separating so-formed anthracene-maleic complex from said liquid solvent containing impurity of said crude anthracene, heating in vaporous form in the presence of a carrier fluid so-separated anthracene-maleic complex and thereby dissociating the same into anthracene and a substance having the re-formed maleic radical, cooling the products of said dissociation and separating refined anthracene therefrom, and employing the re-formed maleic radical of said substance in the form of maleic anhydride to form additional anthracene-maleic complex with anthracene in a said crude mixture thereof.

9. A process of recovering anthracene from a crude mixture thereof, said process comprising, heating said crude anthracene in the presence of a liquid solvent with maleic anhydride and thereby producing an anthracene-maleic complex from which anthracene is dissociable by means including heat, separating so-formed anthracene-maleic complex from said liquid solvent containing impurity of said crude anthracene by means of aqueous alkaline solution, precipitating from the resultant aqueous extract by addition of an acid reagent anthracene-maleic complex formed by said heating, heating in vaporous form in the presence of a carrier fluid so-precipitated anthracene-maleic complex and thereby dissociating the same into anthracene and a substance having the re-formed maleic radical, cooling the products of said dissociation and separating refined anthracene therefrom, and employing the re-formed maleic radical of said substance in the form of maleic anhydride to form additional anthracene-maleic complex with anthracene in a said crude mixture thereof.

10. A process of recovering anthracene from a crude mixture thereof, said process comprising, heating said crude anthracene in the presence of a liquid solvent with maleic anhydride and thereby producing an anthracene-maleic complex from which anthracene is dissociable by means including heat, separating so-formed anthracene-maleic complex from the resultant mixture by means of aqueous alkaline solution, precipitating from the resultant aqueous extract at a temperature of at least about 80° C. the anhydride form of said anthracene-maleic complex by addition of an acidic reagent thereto, heating so-precipitated anhydride in vaporous form in the presence of a carrier fluid to a temperature above at least about 260° C. and thereby dissociating the same into anthracene and a substance having the re-formed maleic radical, cooling products of such dissociation and separating refined anthracene therefrom, and employing the re-formed maleic radical of said substance in the form of maleic anhydride to form additional anthracene-maleic complex with anthracene in a said crude mixture thereof.

11. In a process of recovering anthracene from crude anthracene obtained in coal tar distillation, in which process the crude anthracene is treated with maleic anhydride to react with the anthracene component, the step comprising heating in the presence of admixed carrier fluid a chemical compound containing the anthracene-maleic complex formed in the said process to thereby recover anthracene previously selectively separated in the above reaction from the said crude anthracene.

12. In a process of preparing refined anthracene and derivatives thereof, wherein the anthracene component in crude anthracene is separated in the form of an anthracene-maleic complex, the steps comprising heating anthracene-maleic acid in the presence of water above at least about 80° C. thereby to form anthracene-maleic anhydride and separating in substantially pure form anthracene-maleic anhydride from the water.

CHARLES FRANCIS WINANS.